though; while the other two output terminals 27, 28 of the bridge rectifiers have the resistor in series therewith.

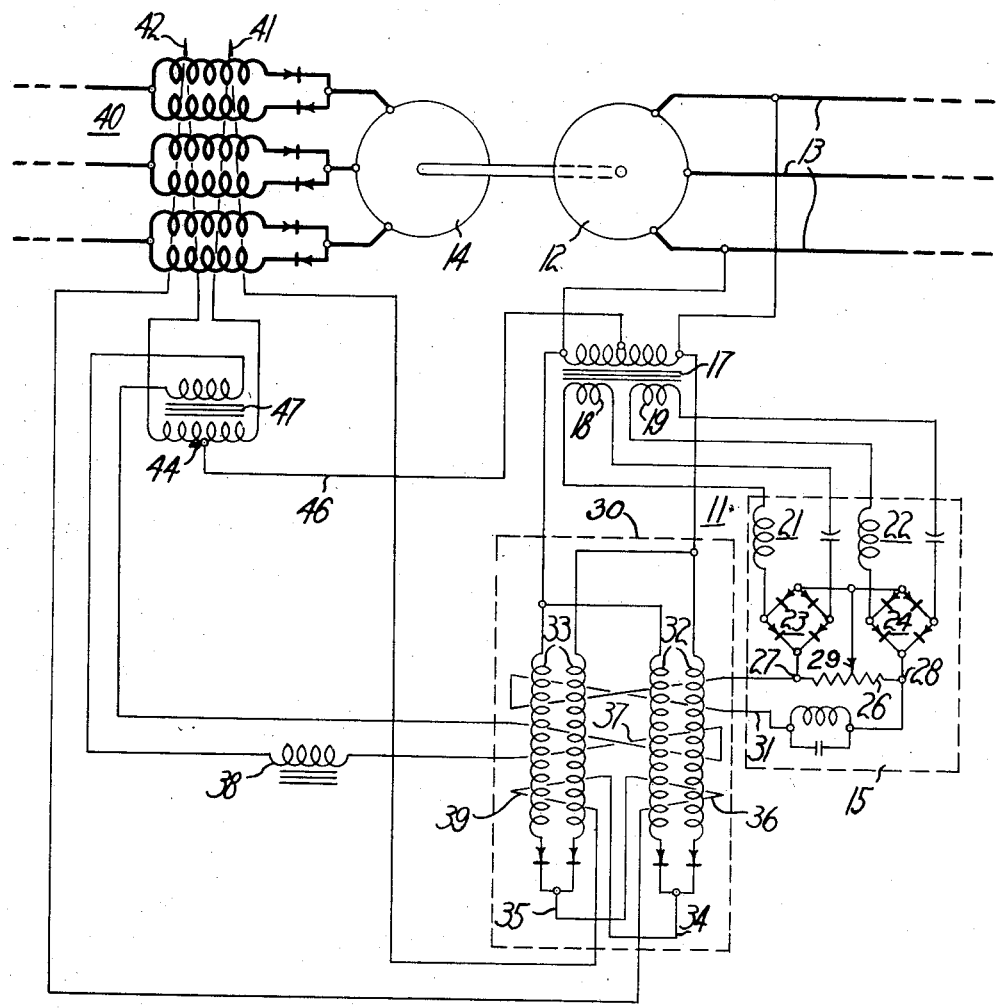

United States Patent Office 2,853,674
Patented Sept. 23, 1958

2,853,674

SATURABLE REACTANCE MEANS HAVING ANTIHUNT BIAS SUPPLIED BY DIFFERENTIAL OF CONTROL WINDINGS

Harold A. Gallatin, Wauwatosa, Wis., assignor to Allis-Chalmers Manufacturing Company, Milwaukee, Wis.

Application December 22, 1955, Serial No. 554,785

4 Claims. (Cl. 323—89)

This invention relates to power amplifiers for use in control circuits. Particularly, it is adaptable to power amplifiers including saturable reactors used in electrical control circuits for regulating frequency or voltage.

In adopting power amplifiers, for example of the saturable reactor static type, to control circuitry, it occurs at times that the overall amplification is of such a degree that the regulating system and the apparatus regulated thereby may tend to become unstable because of an undesired hunting characteristic. It is therefore an object of this invention to provide an improved antihunt circuit for static type power amplifiers.

Still another object of this invention is to provide an electrically isolated antihunt circuit for a control system of a dynamoelectric machine.

Objects and advantages other than those above mentioned will be understood in connection with this invention in accordance with the following description.

These objects are accomplished by providing an antihunt feedback arrangement wherein direct current pulses of an amplifier determinative of the amount of correction required in the circuit to be controlled are utilized to stabilize the operation of the system. Those direct current pulses are sensed from a main power amplifier and fed back to an intermediate amplifier which supplies control current to the main power amplifier.

The single figure of the drawing illustrates a schematic embodiment showing the apparatus and wiring circuitry of an embodiment of this invention.

The control circuit designated generally by the numeral 11 is associated with a motor generator set to detect variations of the generator 12 output supplied to load circuit 13, and in turn effect a suitable correction for deviations of that output. A preferred mode of effecting that correction is by variation of the voltage applied to motor 14 that the motor which may be directly coupled to the generator effects a change in the generator speed and output.

Control circuit 11 includes a suitable detector 15. In this instance the detector is a frequency detector. Transformer 17 of this detector has its primary connected across the three phase alternating current output terminals of the generator. This output may also be referred to as a load circuit. The transformer has two secondary windings 18, 19 that each supply an inductance capacitance resonant circuit.

Each of these resonant circuits 21, 22, supplied from a separate one of those secondary windings, is connected in series to the input terminals of separate full wave bridge rectifiers 23, 24, and the output of the rectifiers is connected in series through a low resistance dropping resistor 26. One portion of this resistor or load element is connected across the D. C. terminals of one bridge rectifier and the balance of that resistor is connected across the D. C. terminals of the other bridge rectifier with the polarities of these two portions opposed. That is, two output terminals of the two bridge rectifiers are connected An adjustable tap or slider 29 bridges across the output circuit of the two bridge rectifiers to provide adjustment of the midpoint of the resistors so that at the desired generator frequence there is no potential difference at the opposite terminals of resistor 26.

One of the resonant circuits is made to be tuned to resonance below the desired frequency of the generator output. If that generator output is 400 cycles per second, low frequency resonant circuit 21 may be tuned for 395 cycles per second. Resonant circuit 22 is a higher frequency circuit, tuned for resonance slightly above the desired frequency of the generator output. In the instance just referred to the high frequency resonant circuit may be tuned for 405 cycles per second.

The resistor in series with the bridge rectifiers is preferably of a low value that the resistance of the resonant circuits is thereby kept low and a relatively steep slope is provided for the resonance peaks to enhance the sensitivity of the circuits to any frequency deviations.

In parallel with resistor 26 is a control coil 31 for a control amplifier 30 resulting in a further reduction of the resonant circuit resistance and a consequent increase in sensitivity by virtue of which large proportional control signal swings are obtained from small frequency deviations.

Power for control amplifier 30 is preferably tapped off the generator output voltage and may, as shown, be provided by the primary of control transformer 17. The embodiment of the control amplifier shown includes two full wave self-saturating circuits 32, 33 connected to provide direct current output to control windings 41, 42 of power amplifier 40. The rectified outputs of these two self-saturating circuits are separately connected in circuit with direct current control windings 41, 42, respectively, of the power amplifier. These D. C. control windings are wound to act in opposition to each other and associated with the power amplifier and its reactance windings to reversibly affect the voltage applied to the motor about a predetermined value.

The separate rectified outputs 34, 35 of the two self-saturating circuits 32, 33, respectively, are cross-fed back from each output to the other self-saturating circuit. This cross-feed back, windings 38, 39, of the outputs provides, when the two self-saturating circuits are unbalanced, an effective amplification of the deviation to increase in a nonlinear amplification or gain of signal to the control windings of the power amplifier. Yet when the saturable circuits are balanced the cross-feed back windings 38, 39 are naturally balanced except when there is a differential of the outputs.

Power amplifier 40 is in circuit between the source of voltage 15 and motor 14 and as a saturable reactor controls the voltage applied from that source to the motor. That motor, being an induction motor, has voltage torque characteristics such that it is utilized to vary the motor speed that the output of the directly connected generator is thereby varied. In each of the three phase lines between the source and the motor, there is a doubler circuit. Each of these includes two self-saturating magnetic amplifiers that provide alternating current to the motor at a controlled voltage depending on the saturization of the reactors. With the self-saturating reactors in doubler circuit arrangement, firing of the saturable reactors will occur each half cycle.

Variance of that saturation and as a result the impedance of the reactance windings is affected by direct current control windings 41, 42. These two control windings, supplied from the outputs of the two circuits of intermediate control amplifier 30, are associated with all six of the reactance windings of the power amplifier. The aiding or bucking because of the control currents takes place in all of the power amplifier cores simultaneously. The two control windings 41, 42 have a common connection, at point 44, from which a common lead 46 provides a return to the center tap of the primary of control transformer 17.

Connecting each direct current control winding circuit is an electrically isolated inductive means with an antihunt circuit feeding back to the control amplifier. This provides a signal sensed from the power amplifier. Interposed between each control winding and common point 44 is a primary winding portion of a pulse transformer 47. One-half of that primary winding is in series circuit with control coil 41 and that common point, and the other primary portion is in series with other control coil 42 and that common point.

Pulse transformer 47 has a secondary winding which comprises a source of supply voltage at any time there is a flux change resulting from current variation in the primary winding. This directly effects a detection of change in the direct currents in control windings 41, 42. The secondary winding supplies current to antihunt winding 37 common to the two full wave self-saturating circuits of control amplifier 30. In this antihunt circuit a filter such as choke 38 may be added.

This pulse transformer is arranged with a midpoint of its primary at common point 44 from the two direct current magnetic amplifier control coils 41, 42. The effect of this arrangement of the primary is dual. It provides reversal of polarity of the induced voltage in the secondary and provides the greatest signal induced in the secondary for the size transformer. When the currents of the two control coils are balanced, the flux density is substantially zero and not biased therefrom. Any change in one or the other control currents provides a variance in either opposite polarity of increased flux density away from zero, giving the greatest rate of change and the least ampere turns. The greatest signal is induced in the secondary of that transformer with the greatest spread of flux density possible of either polarity before saturation, therefore the smallest transformer for a predetermined range.

In operation, when generator 12 has an output at its preset frequency of say 400 cycle there is no potential difference at the terminals of resistor 26, and there is no current flowing in D. C. control coil 31 in parallel with that load resistor.

Therefore, at the desired generator frequency the output of the two full wave self-saturating circuits 32, 33 of control amplifier 30 is balanced, and no change is effected in the impedance of the reactance windings of power amplifier 40 so that the voltage supplied from voltage source 16 to motor 14 is maintained constant.

Under such conditions the D. C. current to control windings 41, 42 from the two full wave self-saturating circuits of the control amplifier does not vary, and there is no flux change in the core of pulse transformer 47 which has its primary connected in circuit with those control windings. No voltage is induced in the secondary of that pulse transformer and there is no current in antihunt winding 37 supplied thereby and associated with the two full wave self-saturating circuits of the control amplifier.

However, when the generator output frequency either goes up or goes down the resonant circuits respond thereto and a voltage appears across load resistor 26 resulting in current flow in control coil 31. That D. C. current flow affects the saturation of the two full wave self-saturating circuits 32, 33 in opposite senses, resulting in the output current of one of those circuits decreasing and the output current of the other circuit increasing. As a result the aiding and bucking D. C. control windings 41, 42 common to the reactance windings of power amplifier 40 have a change in current. There is a resulting effect on the impedance of the reactance windings and the voltage supplied to the motor 14 through those reactance windings is altered. Because of the voltage torque characteristic of induction motor 14 its speed is corrected. Likewise the speed of generator 12 driven by motor 14 is corrected, returning it to the frequency for which it is set.

Specifically, when the generator frequency drops below normal the low frequency detector circuit 21 approaches resonance while the high frequency detector circuit 22 moves further from resonance. The current in that portion of resistor 26 connected to the low frequency detector circuit is increased, and the current in the other portion of the resistor is decreased. Thus, a voltage is applied to control coil 31 of control amplifier 30. The structure of the amplifier and polarity of this voltage is such that the resultant current adds positive control ampere turns to the control amplifier full wave self-saturating circuit which supplies power amplifier aiding control coil 41 and adds negative control ampere turns to the other full wave self-saturating circuit of the control amplifier which supplies bucking control coil 42. That is, the reactors to which positive control ampere turns are added will not be able to absorb as many flux linkages from the anode or output winding and will consequently fire earlier in the cycle to produce a higher average load voltage to the aiding control coil; while the reactors to which negative control ampere turns are added will be able to absorb more flux linkages and thus fire later in the cycle to reduce the average load voltage to bucking control coil 42. Therefore, with respect to the power amplifier the individual reactor cores of that amplifier will not be able to absorb as many flux linkages from their anode or output winding and thus the reactors fire earlier in the cycle to produce a higher average load voltage to motor 14, thereby increasing the motor torque to restore the generator frequency.

On the other hand when the generator frequency increases above the normal for which it is set, the action is reversed from that described above for a decrease in frequency. The frequency detector causes voltage to be applied to the control amplifier control coil 31 of opposite polarity with a current in the opposite direction. This reverses the effect on the two full wave self-saturating circuits and on the aiding and bucking control coils of the power amplifier reactors. Thus the cores of the power amplifier reactors will be able to absorb more flux linkages from their anode or output winding. Consequently the reactors will fire later in the cycle to produce a lower average load voltage to the motor, thereby decreasing the motor speed and restoring the frequency of the connected generator.

In this operation it will be noted that for any change of the generator frequency there is a resulting change in the current supplied from control amplifier 30 to the two control windings 41, 42 of power amplifier 40. A change in those D. C. currents will cause a change of flux in transformer 47 inducing voltage in a secondary thereof and supplying voltage to the antihunt winding 37 associated as a negative feedback bias winding on control amplifier 30. Thus, an antihunt feedback is provided as a result of the direct current pulses to the control windings on the power amplifier. These pulses and the resulting voltage of the antihunt winding are directly determinative of the amount of correction required giving a pulse from the main power amplifier as a feedback to the control amplifier stabilizing the operation of the system.

While but one embodiment of this invention has been shown and described it will be evident to those skilled in the art that variations and changes therein may be made without departing from the spirit of the invention or from the scope of the appended claims.

It is claimed and desired to secure by Letters Patent:

1. An amplifier, detector means for applying a signal to said amplifier, said amplifier having circuit means for providing a direct current output signal variable in response to changes of the signal of said detector means, a pulse transformer having a first winding connected to the output of said amplifier varying the flux of said transformer in response to changes of said direct current output signal of said amplifier, said transformer having a second winding inductively related to its said first winding, and an antihunt feedback winding conductive means connecting said feedback winding to be supplied with voltage from said second winding, said feedback winding associated with said amplifier to affect the saturation of said amplifier to diminish the effect of the output current thereof.

2. In combination, amplifier means comprising a first saturable reactor means having a control winding and direct current output means, a second saturable reactor means including direct current control winding means for varying the saturation and firing time of said second reactor means, detector means for applying a signal to said first saturable reactor means control winding to vary the output of said first saturable reactor means, means for applying said direct current output means to said direct current control winding means of said second saturable reactor, inductive means electrically isolated from said amplifier means and inductively associated with said direct current output means to have an induced voltage in response to changes of current in said direct current output means, feedback means and circuit means connecting said feedback means to be supplied by said induced voltage in said inductive means, said feedback means associated with said first saturable reactor means to diminish the output thereof.

3. In combination, amplifier means comprising a first saturable reactor means having two saturable reactor direct current circuit output means, a second saturable reactor means including two direct current control windings each supplied current separately from said two output means, detector means for applying a signal to said first saturable reactor means to differentially affect said two output means, a transformer having a primary winding with first and second end terminals and a midpoint terminal, one of said control windings connected in circuit with the portion of said primary winding between said first end terminal and said midpoint terminal, the other of said control windings connected in circuit with the portion of said primary winding between said second end terminal and said midpoint terminal, said transformer having a secondary winding, and feedback means supplied by said secondary winding, said feedback means associated with said first saturable reactor means to diminish the output thereof.

4. In combination, amplifier means comprising a first saturable reactor means having two saturable reactor direct current circuits, two associated output means and cross feedback windings from each said output means to the other saturable circuit means, a second saturable reactor means including two direct current control windings each supplied current separately from said two output means, detector means for applying a signal to said first saturable reactor means to differentially affect said two output means, a transformer having a primary winding with first and second end terminals and a midpoint terminal, one of said control windings connected in circuit with the portion of said primary winding between said first end terminal and said midpoint terminal, the other of said control windings connected in circuit with the portion of said primary winding between said second end terminal and said midpoint terminal, said transformer having a secondary winding, and feedback means supplied by said secondary winding, said feedback means associated with said first saturable reactor means to diminish the output thereof.

References Cited in the file of this patent

UNITED STATES PATENTS

| | | |
|---|---|---|
| 2,555,992 | Ogle | June 5, 1951 |
| 2,692,356 | Milsom | Oct. 19, 1954 |